UNITED STATES PATENT OFFICE.

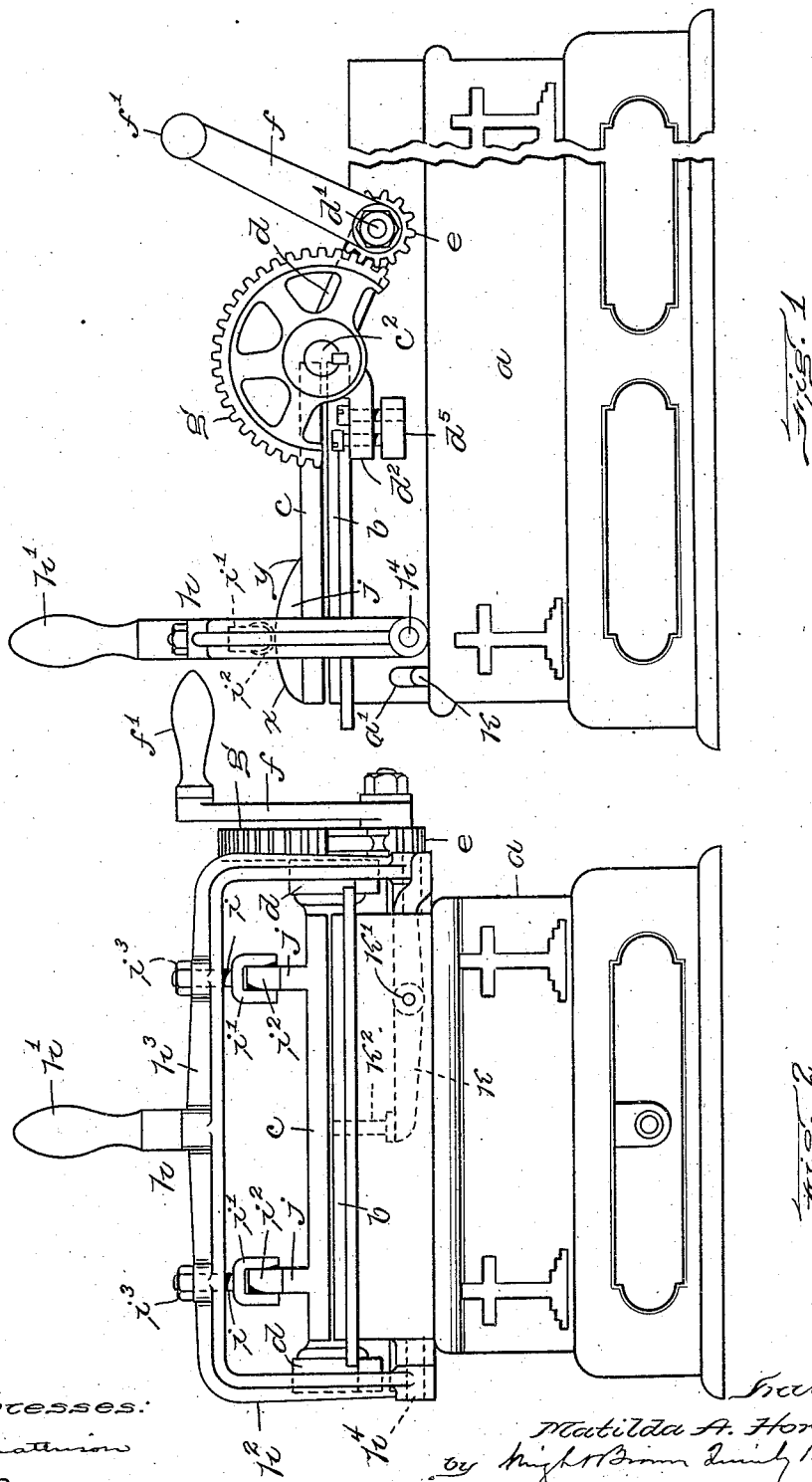

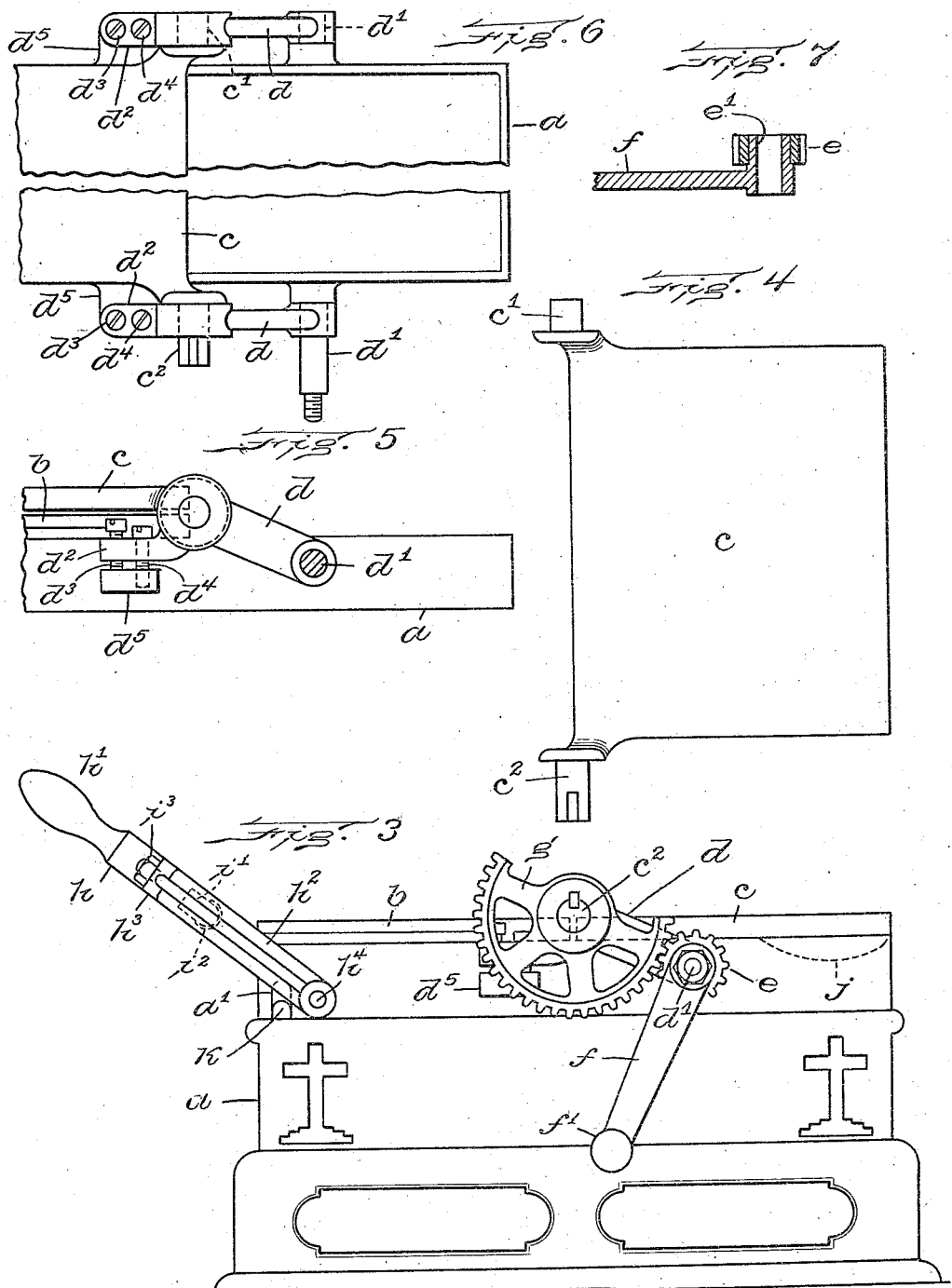

MATILDA A. HORAN, OF BOSTON, MASSACHUSETTS.

MACHINE FOR BAKING ALTAR-BREAD.

No. 889,232.    Specification of Letters Patent.    Patented June 2, 1908.

Application filed February 2, 1907. Serial No. 355,352.

*To all whom it may concern:*

Be it known that I, MATILDA A. HORAN, of Boston, in the county of Suffolk and State of Massachusetts, have invented certain new and useful Improvements in Machines for Baking Altar-Bread, of which the following is a specification.

This invention is an improvement upon the apparatus shown in Letters Patent of the United States, No. 474,601, dated May 10, 1892 for baking the wafers or altar bread used in churches, and it consists in certain improvements which are illustrated upon the drawings described in the following specification and pointed out in the appended claims.

In the accompanying drawings, Figure 1 represents a side elevation of an apparatus embodying the invention. Fig. 2 represents an end elevation of the same. Fig. 3 represents the apparatus with the hinged baking plate opened. Fig. 4 represents the hinged baking plate in detail. Fig. 5 represents the means by which the hinged baking plate is mounted. Fig. 6 is a partial plan view of the means shown in Fig. 5. Fig. 7 is a sectional view of the operating pinion and its crank handle.

On the drawings $a$ represents a suitable supporting frame upon which is a fixed flat baking plate $b$ and a hinged baking plate $c$. The plate $c$ may be moved from its open position, as shown in Fig. 3, to its closed position as shown in Fig. 1, so as to rest upon the batter which is spread upon the plate $b$ preparatory to the operation of baking the bread or wafer. The main portion of the frame $a$ is hollow, means being provided for heating the plate such as gas or oil burners (not shown) so that the two baking plates $b$ and $c$ may be heated to the desired temperature to cause the baking of the bread or wafers between them.

The hinged plate $c$ is provided with trunnions $c'$ $c^2$ which are journaled in arms $d$ (see Figs. 1 and 5). The arms $d$ are themselves pivoted upon studs $d'$ projecting outwardly from the frame $a$ with their axes in alinement. Each arm is provided with a projection $d^2$ through which the adjusting screws $d^3$ $d^4$ are passed for engagement with a lug $d^5$ extending outward laterally from the frame $a$. The end of the screw $d^3$ rests upon the face of the lug, whereas the screw $d^4$, which is passed loosely through the extension $d^2$ of the arm, is screwed into an aperture in the said lug. By means of these adjusting screws, the arms $d$, in which the hinged plate $c$ is trunnioned, may be adjusted to raise and lower the plate $c$ with respect to the fixed plate $b$.

Novel means are provided for moving the hinged plate $c$ from open to closed position and vice versa, said means comprising a crank $f$ composed of a hub portion $e'$ mounted to turn on one of the studs $d'$, and having a handle $f'$. To the hub $e'$ a pinion $e$ is affixed. The pinion $e$ intermeshes with a partial gear $g$ which is keyed to the trunnion $c^2$ so that by rotating the crank $f$, the hinged plate $c$ may be swung about its axis of movement to open or close it.

$h$ represents a lever which is composed of the handle portion $h'$, two side arms $h^2$ $h^2$, and a connecting cross-bar $h^3$, as clearly shown in Fig. 2. The said lever is pivotally connected to the frame by pivots $h^4$ projecting laterally outward from the frame. Passed through the cross-bar $h^3$ are the threaded shanks $i$ of roll carriers $i'$ in which are journaled the antifriction rolls $i^2$. By rotating said carriers, the rolls $i^2$ may be adjusted towards and from the cross-bar $h^3$; after which they are locked in position by lock nuts $i^3$. The rolls $i^2$ are adapted to ride upon cam ribs $j$ formed on one surface of the hinged plate so that when the lever $h$ is in the position shown in Figs. 1 and 2, the rolls exert a downward pressure through the ribs $j$ upon the hinged plate $c$, said pressure being sufficient to closely press the batter between the two baking plates, and being capable of regulation by adjustments of the rolls $i^2$ relatively to the lever.

It will be observed that from the point $x$ to the point $y$ in Fig. 1, the surface of each of the cams is concentric to the axes of the studs $h^4$, so that after the lever $h$ has reached the position shown in Fig. 1, and has therefore exerted the desired pressure on the plate $c$, it may be moved to the right until the rolls $i^2$ reach the surface of the plate $c$, without increasing or diminishing the pressure. Provision is thus made for applying the proper pressure to the plate $c$ without the necessity of careful adjustment of the lever $h$ to an exactly predetermined position.

As it sometimes happens that the plates adhere to the batter, I provide means for separating them, said means comprising a two-armed lever $k$ projecting laterally through an aperture $a'$ in the frame, a pivot $k'$ upon which said lever is pivoted, and a pin $k^2$ which rests upon the inner end of said lever $k$ and projects upwardly through an aperture in the plate $a$ so as to engage the free end of the hinged plate $c$. The outer end of the lever $k$ projects into the path of one of the side arms $h^2$ of the lever $h$, so that when said lever is swung to the left as in Fig. 3, it may engage the projecting end of said lever $k$, and by a still further movement downward, tilt said lever about its pivot and raise the pin $k^2$ so as to lift the plate $c$ slightly.

The operation of the apparatus above described is as follows,—the baking plates $b$ and $c$ being in the position shown in Fig. 3, and the plates being suitably heated, the batter is poured upon the plate $b$. The crank $f$ is then actuated to move the hinged plate $c$ to the position shown in Fig. 1, and the lever $h$ is moved to the position shown in the last-mentioned figure so as to force the hinged plate $c$ downward and compress the batter between the two plates. When the wafer has been sufficiently baked, the operator swings the lever $h$ to the left until it engages the lever $k$ and causes the hinged plate $c$ to be slightly lifted preparatory to throwing the plate back to the position shown in Fig. 3 by means of the crank and gears.

Having thus explained the nature of the said invention and described a way of constructing and using the same, although without attempting to set forth all of the forms in which it may be made, or all of the modes of its use, I declare that what I claim is:—

1. In an altar bread baker, the combination with a frame adapted to be heated, of a fixed baking plate thereon, a hinged baking plate having trunnions, pivoted arms in which said trunnions are journaled, means for adjusting the free ends of said arms, and gearing for oscillating said hinged baking plate, substantially as set forth.

2. In an altar bread baker, the combination with a frame adapted to be heated, a fixed baking plate thereon and a movable baking plate hinged thereto, of means for adjusting said hinged baking plate relatively to said fixed baking plate, cam ribs on the hinged baking plate, a pivoted locking lever, rolls carried by said locking lever and adapted to engage said cam ribs, the latter having portions which are concentric with the axis of the lever, and means by which said rolls may be adjusted relatively to said lever to regulate the pressure on the movable plate, substantially as set forth.

In testimony whereof I have affixed my signature, in presence of two witnesses.

MATILDA A. HORAN.

Witnesses:
  WILLIAM QUINBY,
  A. L. FOLSOM.